United States Patent [19]

Brothers et al.

[11] 4,353,234

[45] Oct. 12, 1982

[54] HEAT TRANSFER SURFACE AND METHOD OF MANUFACTURE

[75] Inventors: Warren S. Brothers, Skaneateles; Albert J. Kallfelz, Camillus, both of N.Y.

[73] Assignee: Carrier Corporation, Syracuse, N.Y.

[21] Appl. No.: 969,506

[22] Filed: Dec. 14, 1978

Related U.S. Application Data

[62] Division of Ser. No. 815,116, Jul. 13, 1977, Pat. No. 4,159,739.

[51] Int. Cl.³ .......................... B21D 53/06; B21H 3/00
[52] U.S. Cl. ............................................ 72/98; 72/78; 29/157.3 AH
[58] Field of Search .......................... 72/68, 71, 78, 98; 165/133, 184; 29/157.3 A, 157.3 AH, 157.3 B

[56] References Cited

U.S. PATENT DOCUMENTS

| | | | |
|---|---|---|---|
| 3,326,283 | 6/1967 | Ware | 165/133 |
| 3,383,892 | 5/1968 | Brothen | 29/157.3 AH |
| 3,753,364 | 8/1973 | Runyan et al. | 165/184 |
| 3,768,290 | 10/1973 | Zatell | 29/157.3 B |
| 3,887,004 | 6/1975 | Beck | 29/157.3 A |
| 4,004,441 | 1/1977 | Leszak | 165/133 |
| 4,168,618 | 9/1979 | Saier et al. | 29/157.3 AH |
| 4,179,911 | 12/1979 | Saier et al. | 165/184 |

Primary Examiner—Lowell A. Larson

[57] ABSTRACT

A heat transfer surface for nucleate boiling of liquids is formed on the outer surface of a heat exchanger tube. Helical ridges having two fins each encase the tube. A fin at each ridge is angled toward the adjacent fin on the adjacent ridge forming a gapped cavity therebetween. The method of making the tube includes rolling alternating deep grooves and shallow grooves in the outside surface of the tube and then flaring the fins to form the gapped cavity.

24 Claims, 5 Drawing Figures

HEAT TRANSFER SURFACE AND METHOD OF MANUFACTURE

This is a division of application Ser. No. 815,116 filed July 13, 1977, now U.S. Pat. No. 4,159,739 granted July 3, 1979.

BACKGROUND OF THE INVENTION

1. Field of the Invention

This invention relates to heat exchanger apparatus for use with a boiling liquid. More particularly this invention relates to a heat exchanger tube having a fluid to be cooled passing therethrough and a boiling refrigerant in contact with the external surface of the tube. The invention also relates to the method of manufacturing a tube of this particular configuration.

2. Prior Art

In certain refrigeration applications such as a chiller or an evaporator liquid to be cooled is passed through a tube while liquid refrigerant is in contact with the outside of the tube. Usually the tube is either immersed in refrigerant or wetted with a refrigerant spray. The refrigerant changes state from a liquid to a vapor absorbing heat from the fluid to be cooled within the tube. The selection of the external configuration of the tube is extremely influential in determining the boiling characteristics and overall heat transfer rate of the tube.

It has been found that the transfer of heat to a boiling liquid is enhanced by the creation of nucleate boiling sites. It has been theorized that the provision of vapor entrapment cavities in the heat exchanger surface creates sites for nucleate boiling.

In nucleate boiling the trapped vapor is superheated by the heat exchanger surface and consequently grows in size until surface tension is overcome and the vapor bubble breaks free from the surface. As the bubble leaves the surface, liquid wets the now vacated area and the remaining vapor has a source of additional liquid for creating vapor to form the next bubble. The continual wetting and release together with the convection effect of the supeheated bubble traveling through and mixing the liquid result in an improved heat transfer rate for the heat exchanger surface.

It is known that the surface heat transfer rate is high in the area where the vapor bubble is formed. Consequently, the overall heat transfer rate tends to increase with the density of vapor entrapment sites per unit area of heat exchanger surface. See for example, U.S. Pat. No. 3,696,861 issued to Webb and entitled "Heat Transfer Surface Having A High Boiling Heat Transfer Coefficient," or *Heat Transfer* by M. Jakob, vol. 1, published by John Wiley and Sons.

There are numerous heat transfer surfaces which utilize nucleate sites to enhance overall heat transfer rates. In U.S. Pat. No. 3,454,081 granted to Kun and Czikk entitled "Surface For Boiling Liquids," a cross-grooved boiling surface layer is created having sub-surface cavities with restricted openings to the outer surface of monoscopic density. In U.S. Pat. No. 3,326,283 issued to Ware and entitled "Heat Transfer Surface," fins on tube are deformed to form indentations for the promotion of nucleate boiling.

There are also many methods of creating nucleate boiling surfaces. In U.S. Pat. No. 3,487,670 entitled, "Method of Forming Indentations In Fins Extending From A Heat Transfer Surface," a method is disclosed of forming the heat transfer surface in the Ware patent above. The fins are rolled with an indenting tool which flares the fin material beyond each side wall of the fin to form the vapor entrapment cavity. In U.S. Pat. No. 3,496,752 granted to Kun the method includes scoring the heat transfer surface to form grooves of microscopic density and then forming cavities by deforming the material between the grooves into the grooves. In Webb, U.S. Pat. No. 3,696,861, fins on a heat exchange tube are unidirectionally rolled over toward the adjacent fin to form vapor entrapment sites therebetween.

The creation of a cost effective high performance (nucleate boiling) heat exchanger tube that can be manufactured from a commercial tube blank in a single pass on a conventional tube finning machine is the problem resolved herein. In order for the tube to be cost effective, the additional expense in manufacturing the high performance tube must be recovered either in the decreased expense of construction utilizing the higher performance tube or in increased overall capacity of the heat exchanger.

SUMMARY OF THE INVENTION

An object of the invention is to form a highly effective heat transfer surface.

Another object of the invention is to sustain nucleate boiling at a relatively high rate on a heat transfer surface.

Another object of the present invention is to provide a high performance boiling tube which can be used with existing refrigeration equipment.

A still further object of the present invention is to provide an economical and durable heat exchanger tube having increased external surface area over a smooth tube.

Another object of the present invention is to provide a high performance nucleate boiling tube.

A still further object of the present invention is to provide a high performance tube which can be formed by a single rolling operation.

A further object of the present invention is to produce a high performance tube by rolling a conventional tube blank in a tube finning machine.

Other objects will be apparent from the description to follow and from the appended claims.

The preceding objects are achieved according to a preferred embodiment of the invention by the provision of alternating deep grooves and shallow grooves on the surface of a heat exchanger tube. A ridge is defined by adjacent deep grooves, the ridge having a base portion and two fins extending radially outward therefrom. The shallow groove separates the two fins extending from the base portion. The two fins of each ridge are then bent in opposite directions toward the next adjacent fin on either side so that the fin partially encases the deep groove forming a single gapped cavity between adjacent ridges for promoting nucleate boiling.

The present invention is formed in a single pass through a conventional tube finning machine. A series of discs are mounted on a tool arbor in engagement with the tube passing through a tube finning machine. These discs are so arranged that alternating deep grooves and shallow grooves are first formed in the outer surface of the tube. Thereafter a flaring disc is applied to the shallow groove to force the fins outward over the deep grooves forming the gapped cavity between adjacent ridges.

DESCRIPTION OF THE PREFERRED EMBODIMENT

The embodiment of the invention described below is adapted for use in a heat exchanger having a fluid to be cooled passing through a heat exchanger tube and simultaneously having a refrigerant to be vaporized in contact with the external surface of the tube. This heat transfer arrangement of fluid to be cooled and refrigerant can be found in an evaporator or chiller of a refrigeration system. In a typical application a plurality of parallel heat exchanger tubes are mounted such that several tubes form a fluid flow circuit and a plurality of parallel circuits are provided for the fluid to be cooled. Usually all the tubes of the various circuits are contained within a single casing wherein they are immersed in refrigerant.

Figure 2:
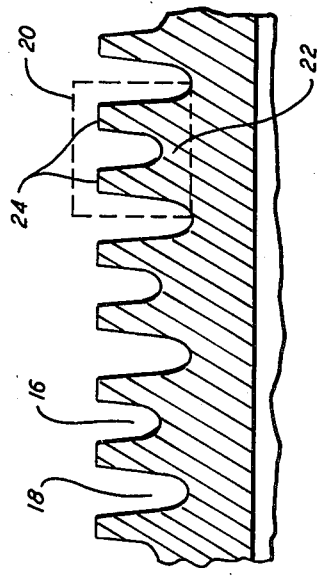
FIG. 2 is a partial sectional view of the same tube as shown in FIG. 1 after having the alternating shallow and deep grooves rolled therein.
Figure 1:
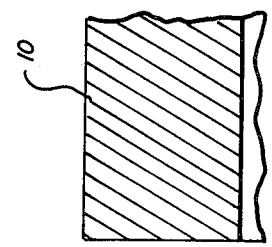
FIG. 1 is a partial sectional view of a smooth surface heat exchanger tube.

Referring now to the drawings, FIG. 1 is a cross-sectional view of one wall of a smooth surface cylindrical tube prior to rolling. FIG. 2 is a cross-sectional view of the same tube after alternating deep grooves 18 and shallow grooves 16 have been rolled therein. As a result of the rolling ridges 20 are formed, each ridge 20 constituting the part of the tube between adjacent deep grooves 18 which extends radially outward from an imaginary line drawn from the lowest point of a deep groove 18 to the lowest point of the adjacent deep groove 18. In FIG. 2 a ridge 20 is denoted as that part of the tube shown within the dotted line.

Ridges 20 each have a base portion 22 and two fins 24. The base portion 22 is that part of ridge 20 that is located radially outward from an imaginary line connecting the lowest point of adjacent deep grooves and radially inward from an imaginary line drawn between the lowest point of adjacent shallow grooves 16. Fins 24 are mounted to base portion 22 one on each side of shallow groove 16 and extend radially outward from the imaginary line connecting the lowest points of adjacent shallow grooves 16.

Figure 3:
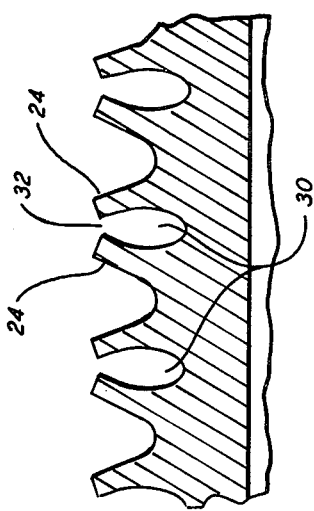
FIG. 3 is a partial sectional view of the same tube as shown in FIGS. 1 and 2 after having the fins flared to form the gapped cavities of the invention.

FIG. 3 is a cross-sectional view of the tube from FIGS. 1 and 2 having fins 24 flared to partially enclose cavities 30. Fins 24 have been angled away from the center of ridge 20 toward the adjacent ridge thereby partially covering deep groove 16. The pair of fins on each ridge are angled in opposite directions forming a narrow gap with the adjacent fin from the adjacent ridge. Gap 32, between the ends of the adjacent fins 24, is of such a dimension as to promote nucleate boiling within cavity 30. Cavity 30 is defined by the bottom of deep groove 18, the sides of adjacent base portions 22 and the sides of adjacent fins 24.

Ridges 20 are normally rolled in helical arrangement around tube 10. Thereby a single gapped cavity 30 is formed extending helically about the entire length of the heat exchanger tube. Of course, if double lead tooling is used two gapped cavities will extend the entire length of the heat exchanger tube. Obviously, more cavities may be provided by either increasing the number of leads in the tooling or by discontinuing the cavities at some location over the length of the tube, as for example to form lands on the tube surface whereby the tube may be held within a conventional tube sheet.

Figure 4:
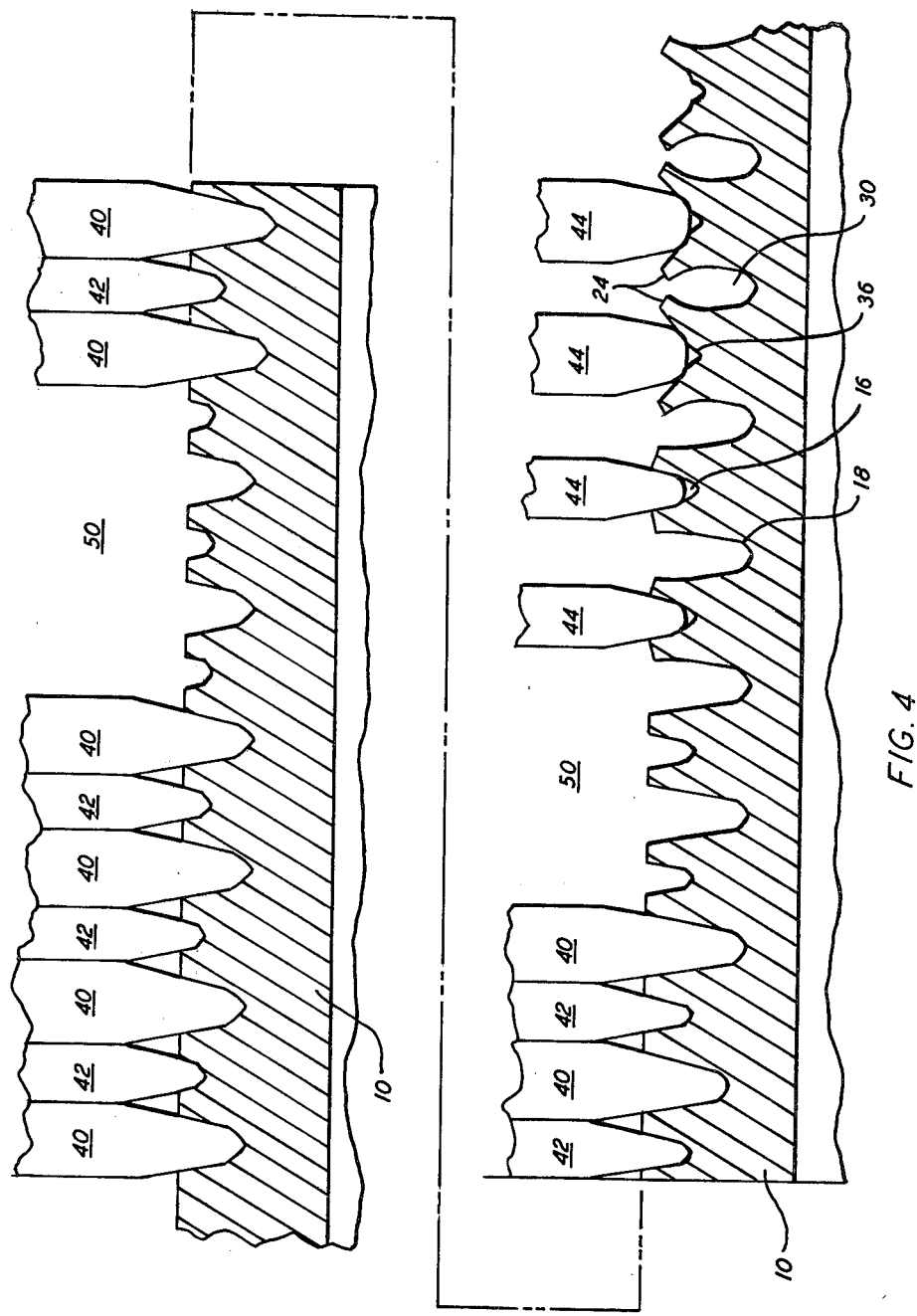
FIG. 4 is a partial sectional view of the heat exchanger tube with the tool gang engaged therewith gang showing the progression of rolling discs and flaring discs utilized to form the shallow and deep grooves and the gapped cavities of the invention.

In FIG. 4 the tool arrangement used within a conventional tube finning machine to roll this high performance tube is shown. In the conventional tube finning machine cylindrical discs are mounted on a multiplicity of tool arbors in such a manner that when rotated the discs displace portions of the tube forming the desired configuration. From FIG. 4 it can be particularly seen that alternating deep grooves and shallow grooves are rolled into the surface of tube 10 by alternating deep groove discs 40 and shallow groove discs 42, said discs progressing in depth as the tube proceeds along tool gang 38. The specific number of rolling discs to achieve a specific width or depth of a particular groove or the number of tool arbors using multiple lead tooling is a design expedient as is the space, if any, between adjacent groups of discs. Also shown in FIG. 4 are a series of four flaring discs 44 for use with double lead tools, said discs being designed to fit within shallow groove 16 formed in ridges 20 on the surface of the tube such that the pair of fins 24 on each ridge are flared outwardly in opposite directions. It can be seen that the four flaring discs, a narrow and a wide disc on each set of double lead tooling, are arranged such that upon rolling the fins are progressively displaced. During flaring the gapped cavity 30 is formed by fins 24 being partially displaced to encase the groove 18 leaving a narrow gap 32 therebetween. It can be further seen in FIG. 4 that flare discontinuities 36 are produced at the bottom of shallow groove 16 when the fins 24 are flared. These flare discontinuities provide additional surface area and irregularities to promote nucleate boiling at sites other than cavities 30.

In a typical heat exchange application a copper tube having a 0.745 inch external diameter and a 0.0515 inch wall thickness would be utilized. After rolling and flaring the wall thickness measured at the bottom of the gapped cavity is approximately 0.028 inches.

Figure 5:
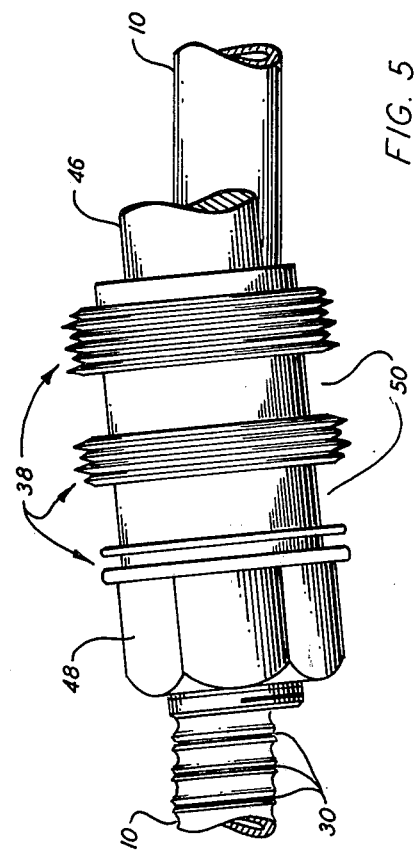
FIG. 5 is a perspective view of a tool arbor having tool gang thereon shown skewed slightly to the tube being rolled.

FIG. 5 shows an arbor 46 mounted so that its axis is skewed slightly to the axis of tube 10. Mounted on arbor 46 is tool gang 38 as shown in FIG. 4 and arbor nut 48 locking tool gang 30 and the appropriate spacer 50 in place on the arbor. As can be seen from FIG. 5 the axis of the tool arbor forms an acute angle approximating 3 degrees with the axis of tube 10. This small amount of skew provides for tube 10 being driven along its axis as arbor 46 and the tool gang 38 thereon are rotated. Consequently the tube 10 is moved through the tube finning machine (not shown) containing the tool gang and arbor as the arbor is rotated.

Within tube 10 is a conventional smooth mandrel (not shown) for supporting the interior surface of the tube during rolling. The mandrel is of sufficient length that the interior surface of the tube is supported beneath all the discs on the tool arbor.

It is further obvious that as the tube proceeds along its axis, first the alternating deep grooves and shallow grooves are rolled progressively deeper into the tube surface and then the fins are flared outwardly to form the gapped cavities, all rolling occurring in a single pass through the tube finning machine. In a typical application a plurality of tool arbors mounted about the circumference of the tube will be simultaneously utilized to provide smooth and consistent rolling.

The invention has been described in detail with particular reference to a preferred embodiment thereof, but it will be understood that variations and modifications can be effected within the spirit and scope of the invention.

We claim:

1. A method of forming a heat exchanger tube having integral ridges with fins angled in opposite directions to provide gapped cavities between the ridges comprising the steps of:
   providing a tubular blank of substantially circular cross-section;
   rolling the tubular blank to form alternating shallow grooves and deep grooves in the external surface thereof, the material between the deep grooves being a ridge having two fins as a part thereof; and
   flaring the fins of each ridge in opposite directions so that each fin extends over the deep groove on its respective side of the ridge forming a narrow gap with the flared fin from the adjacent ridge thereby converting the deep groove into a gapped cavity.

2. The method as set forth in claim 1 and further including the step of:
   translating the blank so that the step of rolling includes helical grooves being formed in the tube blank.

3. The method as set forth in claim 2 wherein the steps of rolling and flaring are accomplished by separate tools on the same tool arbor in an integral tube finning machine.

4. The method as set forth in claim 3 wherein steps of rolling and flaring further include using multiple tool arbors on a tube finning machine.

5. The method as set forth in claim 4 wherein the step of rolling includes forming two parallel ridges with double lead tools.

6. A method of forming a heat exchanger tube having integral ridges, each ridge having two fins angled in opposite directions to form gapped cavities and ridges comprising the steps of:
   providing a tubular blank of substantially circular cross-section;
   mounting the blank for rotational movement about its axis as well as movement in the direction of the axis;
   locating rolling tools on a tool arbor adjacent to the blank;
   making a plurality of deep grooves in the blank with a deep disc tool;
   forming with a shallow disc tool a plurality of shallow grooves in the blanks, the shallow grooves being spaced between alternating deep grooves; and
   flaring with a flaring tool those parts of the blank between adjacent deep grooves which extend radially outward from the bottom of the shallow groove such that those parts angle over the deep grooves forming gapped cavities.

7. The method as set forth in claim 6 wherein the deep disc tool, the shallow disc tool and the flaring tool are all held in the same tool arbor and further including the step of:
   rotating the tool arbor and the tools thereon in rolling engagement with the tube forcing the tube to rotate therewith.

8. The method as set forth in claim 7 wherein the step of rotating includes the tool arbor axis being inclined at a slight angle to the tube axis so that upon rotation of the tool arbor the tube is rotated about its axis and simultaneously advanced in the direction of its axis whereby helical grooves are formed in the tube.

9. The method as set forth in claim 8 wherein the step of locating rolling tools includes multiple tool arbors being spaced about the tube and offset in the direction of the tube axis so that multiple lead grooves may be formed.

10. Apparatus for forming fins on a tube outer side, which fins run circumferentially about the tube in a continuous fashion with the outer ends of the fins approaching the outer ends of adjacent fins forming a chamber between adjacent fins, including:
    support means for said tube;
    rolling disc means for forming a finned tube, said rolling disc means rotating relative to said tube and including a plurality of rolling discs of successively increasing diameters rotating about an axis of said rolling disc means;
    means for notching the upper surface of the formed fins.

11. Apparatus according to claim 10, wherein said notching means includes a notching roller co-axially mounted with said rolling disc means.

12. Apparatus for forming fins on a tube outer side, which fins run circumferentially about the tube in a continuous fashion with the outer ends of the fins approaching the outer ends of adjacent fins forming a chamber between adjacent fins, including:
    support means for said tube;
    rolling disc means for forming a finned tube, said rolling disc means rotating relative to said tube and including a plurality of rolling discs of successively increasing diameters rotating about an axis of said rolling disc means;
    means for notching the upper surface of the formed fins, said means for notching including a plurality of notching discs located between at least some of said rolling discs so that the rolling and notching discs are arranged in an alternating sequence.

13. Apparatus according to claim 12, including at least one bending roller means co-axially mounted with said rolling and notching disc means.

14. Apparatus according to claim 13, wherein a distance disc is co-axially mounted between said bending roller and said rolling and notching disc means.

15. Apparatus according to claim 14, wherein a correction disc is co-axially mounted before said notching disc means.

16. Apparatus according to claim 12, wherein the sum (W+K) of the thickness of a rolling disc and an adjacent notching roller corresponds to the fins spacing $T_R$.

17. Apparatus according to claim 16, wherein the thickness W of a rolling disc is greater than the thickness K of a notching roller.

18. Apparatus according to claim 16, wherein the diameter of notching discs increases in correspondence with the diameter of the rolling discs.

19. Apparatus according to claim 13, wherein said rolling and notching discs are mounted in a tool holder and there are provided three tool holders which are arranged 120° from each other, two of said tool holders having bending rollers.

20. Apparatus according to claim 19, wherein there are provided for each tool holder rolling discs and notching discs corresponding to the wished multiplicity of threading of the tube.

21. Apparatus for forming fins on a tube outer side, which fins run circumferentially about the tube in a continuous fashion with the outer ends of the fins approaching the outer ends of adjacent fins forming a chamber between adjacent fins including:
 a plurality of tool holders arranged at the circumference of the tube in staggered relation to each other;
 each tool holder including a plurality of alternating rolling and notching discs;
 at least one tool holder including a bending roller co-axially mounted with the rolling and notching discs.

22. Apparatus according to claim 21, wherein there are provided three tool holders arranged at 120° from each other, at least two of the said tool holders containing said bending rollers.

23. Apparatus according to claim 21, wherein the tube is rotatably mounted.

24. A process for forming fins on a tube outer side which fins run circumferentially about the tube in a continuous fashion with their outer ends approaching the outer ends of adjacent fins forming a chamber between adjacent fins including the steps of:
 displacing the material making up the tube wall in an outward direction by means of a rolling process, said rolling process being carried out by means of rolling discs positioned at the circumference of the tube;
 notching the ends of the fins as they are being formed, said notching step being effected by means of a plurality of notching discs co-axially mounted in an alternating fashion with said rolling discs;
 bending the ends of the notched fins into Y-fins, said bending step being effected by means of a bending roller mounted subsequent to said rolling and notching discs.

* * * * *